W. L. PAUL.
COUPLING FOR THE BEAMS OF CULTIVATORS OR GANG PLOWS.
APPLICATION FILED JULY 22, 1909.
943,704.
Patented Dec. 21, 1909.
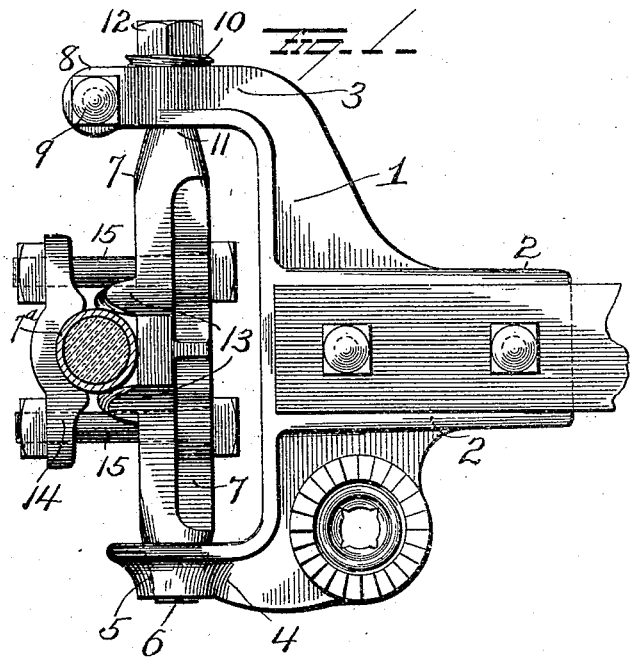
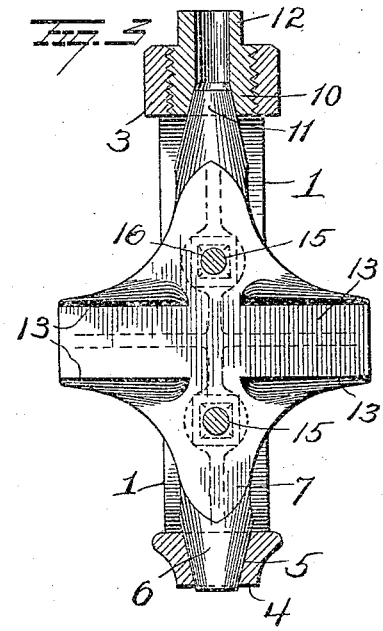
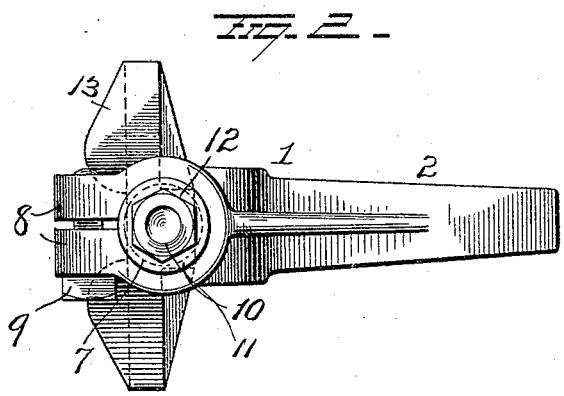
WITNESSES
INVENTOR
W. L. Paul
By H. A. Seymour
Attorney

UNITED STATES PATENT OFFICE.

WILLIAM L. PAUL, OF SOUTH BEND, INDIANA, ASSIGNOR TO OLIVER CHILLED PLOW WORKS, OF SOUTH BEND, INDIANA.

COUPLING FOR THE BEAMS OF CULTIVATORS OR GANG-PLOWS.

943,704.  Specification of Letters Patent.  Patented Dec. 21, 1909.

Application filed July 22, 1909. Serial No. 509,051.

*To all whom it may concern:*

Be it known that I, WILLIAM L. PAUL, of South Bend, in the county of St. Joseph and State of Indiana, have invented certain new and useful Improvements in Couplings for the Beams of Cultivators or Gang-Plows; and I do hereby declare the following to be a full, clear, and exact description of the invention, such as will enable others skilled in the art to which it appertains to make and use the same.

This invention relates to improvements in couplings for the beams of cultivator or plow gangs,—the object of the invention being to so construct the coupling that the same can be readily adjusted to take up wear and so that the adjustable bearing for one of the coupling members can be normally locked in position to which it may be adjusted.

With this object in view the invention consists in certain novel features of construction and combinations of parts as hereinafter set forth and pointed out in the claims.

In the accompanying drawings, Figure 1 is a view of my improved coupling in side elevation. Fig. 2 is a plan view, and Fig. 3 is a sectional view on the line $x$—$x$ of Fig. 1.

My improved coupling is intended for use in connecting the arch which unites the forward ends of the beams of cultivator or plow gangs, with said beams and therefore one of said couplings will be secured to each beam.

The coupling comprises a bracket 1 having a rearwardly projecting member 2 adapted for attachment to the forward end of a cultivator or plow beam. Arms 3—4 project forwardly from the upper and lower ends of the bracket 1 and the lower arm 4 is made with a conical seat 5 which forms a bearing for the lower conical end 6 of a vertical shaft 7. The upper arm 3 of the bracket is bifurcated and provided with lugs 8 for the passage of a screw bolt 9. The bifurcated arm 3 is internally threaded for the accommodation of an externally threaded bearing member 10 having a conical seat for the reception of the conical upper end 11 of the shaft 7. The bearing member 10 is provided with an angular portion 12 for the reception of a wrench for turning said bearing member to adjust the same and compensate for wear of the conical journals of the shaft 7 in their bearings. When the bearing member 10 shall have been adjusted it will be clamped into position between the bifurcated members of the arm 3 by tightening the screw bolt 9 which passes through the lugs 8. The shaft 7 is provided with laterally projecting arms 13 which form seats for a sleeve 7ᵃ on the arch which connects the two gangs. The arch is held in place by means of a cap 14 and bolts 15, the latter passing through holes 16 in the shaft 7 and having their free ends threaded for the reception of suitable nuts.

Having fully described my invention what I claim as new and desire to secure by Letters-Patent, is,—

1. A coupling of the character described, comprising a bracket adapted for attachment to a cultivator or plow beam and provided with forwardly projecting arms, one of said arms having a conical bearing, a bearing member adjustable in the other arm and having a conical bearing, a shaft mounted in said conical bearings, and means for attaching a bar to said shaft.

2. A coupling of the character described, comprising a bracket adapted for attachment to a cultivator or plow beam and provided with forwardly projecting arms, one of said arms having a conical bearing, a bearing member adjustable in the other arm and having a conical bearing, a shaft mounted in said conical bearings, means for locking the adjustable bearing member, and means for attaching a bar to said shaft.

3. A coupling of the character described, comprising a bracket adapted for attachment to a cultivator or plow beam and provided with forwardly projecting arms, one of said arms having a conical bearing and the other of said arms being bifurcated, a threaded bearing member in the bifurcated arm and provided with a conical bearing, a screw bolt for locking the bearing member in position, a shaft having conical ends mounted in said conical bearings and provided with arms, and means for securing a bar or beam to the arms of the shaft.

In testimony whereof, I have signed this specification in the presence of two subscribing witnesses.

WILLIAM L. PAUL.

Witnesses:
 W. A. WEED, Jr.,
 THOS. A. FREEMAN.